(No Model.)
S. R. HACKLEY.
HYDRANT COUPLING.
No. 418,513. Patented Dec. 31, 1889.
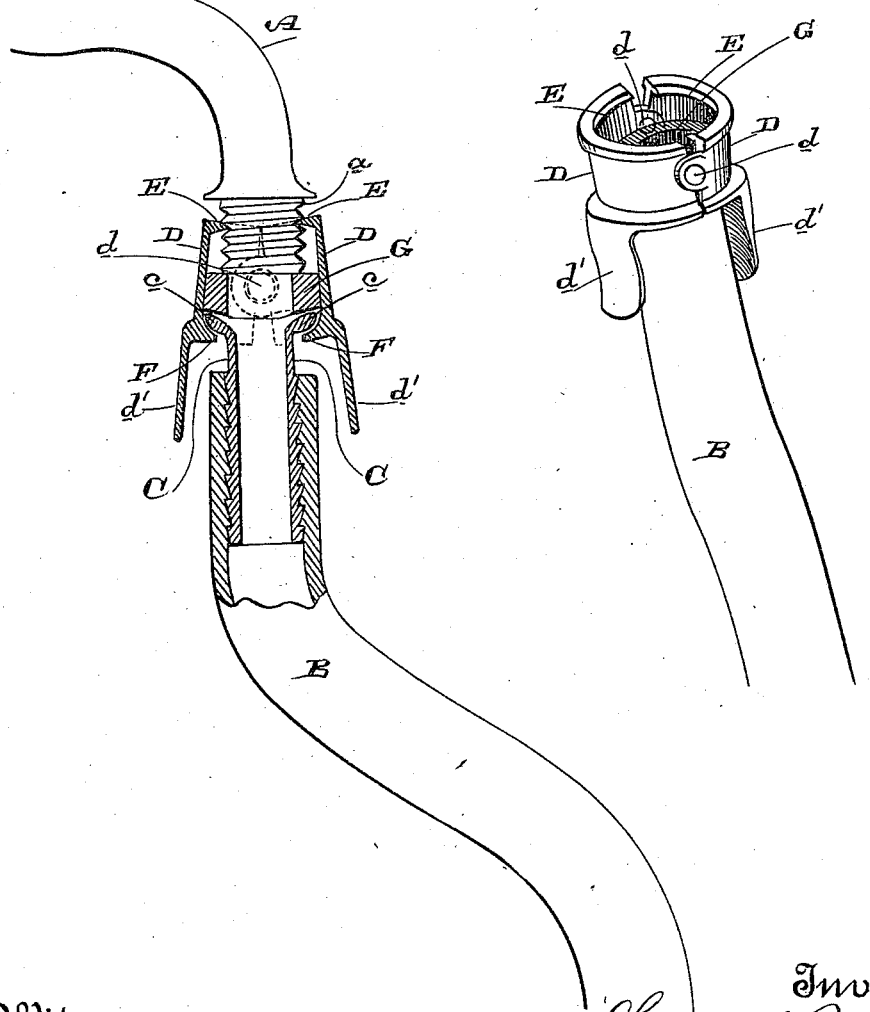
Witnesses,
Geo. H. Strong
J. H. Nourse
Inventor,
Samuel R. Hackley
By Dewey & Co.
Attys

UNITED STATES PATENT OFFICE.

SAMUEL R. HACKLEY, OF SAN FRANCISCO, CALIFORNIA.

HYDRANT-COUPLING.

SPECIFICATION forming part of Letters Patent No. 418,513, dated December 31, 1889.

Application filed October 4, 1889. Serial No. 326,030. (No model.)

*To all whom it may concern:*

Be it known that I, SAMUEL R. HACKLEY, a citizen of the United States, residing in the city and county of San Francisco, State of California, have invented an Improvement in Hydrant-Couplings; and I hereby declare the following to be a full, clear, and exact description of the same.

My invention relates to that class of couplings especially adapted for connecting the hose with the hydrant; and the object of my invention is to provide a coupling which can be readily and quickly manipulated, forming a water-tight joint.

My invention consists in the hereinafter-described two-part swinging or hinged coupling applied to the end of the hose and automatically tightening itself under the pressure of water onto the hydrant-screw.

Referring to the accompanying drawings for a more complete explanation of my invention, Figure 1 is a longitudinal section of my coupling, showing it on the hydrant. Fig. 2 is a perspective view of my coupling.

A is any suitable hydrant or faucet, having the usual screw $a$ upon its end.

B is a short section of hose, in the end of which is inserted a pipe C, secured therein in the usual manner, said pipe having on its forward end a flange $c$, the outer face of which is made with a bevel or slope, preferably a convex spherical curve.

D are two semi-cylindrical jaws hinged together at each side at the points $d$. Said jaws have at their forward ends the straight flanges E and at their rear ends the flanges F, the inner faces of which are formed with a bevel or slope, preferaby a concave curve corresponding to the convex curve of the flange $c$ of the pipe C. The jaws are provided with rear extensions or handle portions $d'$, as shown.

G is a washer.

The pipe C, before being placed in the hose, is dropped through between the jaws until its convex flange $c$ is seated against the corresponding inner flanges F of the jaws. Then said pipe is inserted and wired into the hose in any suitable manner, and the washer is placed between the jaws and lies against the end of the pipe.

Now, to connect the hose with the hydrant the jaws are grasped by their handle portions, so as to expand them, and thus expanded they are fitted over the screw $a$ of the hydrant. The elasticity of the washer is sufficient to hold them temporarily in place. As soon as the pressure of the water is felt it forces the beveled or spherical flange $c$ against its correspondingly beveled or spherical seat F, thereby expanding the rear portion and contracting the front portion of the jaws, (as the pressure of contact of the two flanges is exerted on the other side of their pivotal centers,) so that the forward flange E of the jaws enters the screw-threads $a'$, and as long as the pressure is on the jaws are held tightly and automatically to said screw. As soon as said pressure is relieved the hose may be removed by slightly pressing the handle portion of the jaws, thereby opening them from the screw.

Having thus described my invention, what I claim as new, and desire to secure by Letters Patent, is—

1. A hydrant-coupling consisting of opposing freely-swinging jaws adapted to engage the hydrant, and a pipe to be fitted to the hose, having an external sloping flange seated against the inner walls of the jaws, whereby, when the pressure of water is on, the pipe will close the jaws on the hydrant, substantially as herein described.

2. A hydrant-coupling consisting of opposing freely-swinging jaws adapted to engage the hydrant and having an internal sloping flange at their outer or rear ends back of their pivotal centers, and a pipe to be fitted in the hose and jaws and having an external sloping flange seated against the flange of the jaws, whereby, when the pressure of water is on, the contact of the flanges closes the jaws on the hydrant, substantially as described.

3. The hydrant-coupling consisting of the opposing freely-swinging jaws adapted to engage the hydrant and having internal concave spherical flanges at their rear ends back of their pivotal centers, and the pipe adapted to be connected with the hose and having an external convex spherical flange seated against the flanges of the jaws, whereby, when the pressure of water is on, the contact of the flanges effects the contraction of the jaws and their engagement with the hydrant, substantially as herein described.

4. A hydrant-coupling consisting of the opposing freely-swinging jaws having a flange at their forward end for engaging the screw of the hydrant and an internal sloping or beveled flange at their rear end, and the pipe adapted to be secured in the hose and having an external sloping or beveled flange seated against the rear flange of the jaws, substantially as and for the purpose herein described.

5. A hydrant-coupling consisting of the opposing freely-swinging jaws adapted to engage the hydrant, said jaws having rear handle portions, and an internal sloping or beveled flange at their rear ends, and the pipe to be secured in the hose and having an external sloping or beveled flange seated against the rear flange of the jaws, substantially as and for the purpose herein described.

In witness whereof I have hereunto set my hand.

SAMUEL R. HACKLEY.

Witnesses:
C. D. COLE,
J. H. BLOOD.